United States Patent [19]

Guiset

[11] 4,167,067

[45] Sep. 11, 1979

[54] MEASURING DEVICE FOR MOUNTING CORRECTIVE LENSES IN SPECTACLES RIMS

[75] Inventor: Michel Guiset, Paris, France

[73] Assignee: Essilor International, Joinville le Pont, France

[21] Appl. No.: 884,645

[22] Filed: Mar. 8, 1978

[30] Foreign Application Priority Data

Mar. 15, 1977 [FR] France ................. 77 07641

[51] Int. Cl.² .............................................. A61B 3/10
[52] U.S. Cl. ............................................. 33/200; 351/5
[58] Field of Search ............... 33/174 A, 200; 351/5, 351/20

[56] References Cited

U.S. PATENT DOCUMENTS

| 1,981,438 | 11/1934 | Smith | 33/200 |
| 2,491,312 | 12/1949 | Henry et al. | 351/5 |
| 2,632,257 | 3/1953 | Belgard | 33/200 |
| 2,884,832 | 5/1959 | Engelmann | 33/200 |
| 3,987,554 | 10/1976 | Pastore | 33/200 |
| 4,055,900 | 11/1977 | Grolman et al. | 351/5 |

Primary Examiner—Richard R. Stearns
Attorney, Agent, or Firm—Burgess, Ryan and Wayne

[57] ABSTRACT

A measuring device which can be used when corrective lenses having a progressively varying focal strength are mounted on the rims of a spectacle frame. This device allows the compatibility of said lenses with said frame and with the user, and the monocular measurement of the vertical position of the pupils of the user's eyes with respect to the internal lower edge of the said rims to be checked. The device comprises a preferably opaque or colored support, means for removable mounting and maintaining said device in the groove of one of the rims, a reference element vertically movable within a recess provided in said support, a stop provided at the lower portion of said recess, and at least one measuring scale provided on said support in front of said reference element.

2 Claims, 5 Drawing Figures

MEASURING DEVICE FOR MOUNTING CORRECTIVE LENSES IN SPECTACLES RIMS

The present invention is related to a device to be used when mounting corrective lenses, having a progressively varying focal strength, on spectacle rims.

Corrective lenses having a progressively varying focal strength are multifocal lenses comprising a refraction surface, the focal strength of which varies continuously between a centre of remote vision and a centre of near vision, the zone defined between these two points being called the "progression zone".

Corrective lenses must be mounted very precisely on the associated spectacle rims. In point of fact, in order for the user to obtain optimal vision, whatever be the distance of the objects viewed, it is necessary that both the centres of remote and near vision of said corrective lenses be correctly placed in front of the user's eyes. This can only be achieved if the position of the user's eyes with respect to the coordinates of the rims has been accurately measured. Various appliances or devices have already been proposed with a view to allowing such measurements to be carried out.

One known device of this kind comprises a camera adapted to photograph, at a 1:1 scale, a user wearing a spectacle frame. This device gives quite satisfactory results, but it is comparatively bulky and costly.

Devices of a less complex construction are also known. These devices are adapted to be placed into the grooves of the rims of a spectacle frame. In the present description the expression "rim of the spectacle frame" designates the part of such a frame which holds a corrective lens or a non-corrective lens. Said known device comprises a fixed measuring scale which, however, only allows the vertical distance between the pupils of the user's eyes and the internal lower edges of the rims of the spectacle frame to be measured.

It is an object of the present invention to provide a device which allows not only the position of the pupils of the user's eyes with respect to the internal lower edges of the rims of a spectacle frame worn by the user to be determined, but also allows the checking of the compatibility of the frame with the prescribed lenses and with the user to be determined as well as the checking of the coincidence of the viewing direction of the user's eyes when viewing a near object.

The device according to the invention comprises a preferably opaque or coloured support and means adapted to allow said device to be detachably mounted into the groove of one of the rims of the spectacle frame, said device further comprising a reference element, vertically movable within a recess provided in said support, and at least one measuring scale provided on said support in front of said reference element.

The invention will be described herein after in a more detailed manner with reference to the appended figures which show, by way of example, but not of limitation, several embodiments of the invention.

Figure 1:
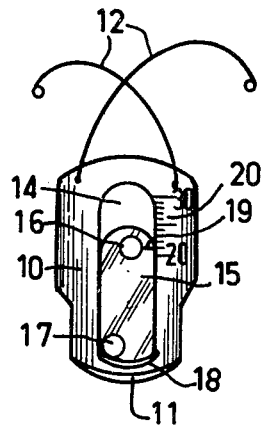
FIGS. 1, 2 and 3 show various embodiments of the device according to the present invention.
Figure 2:
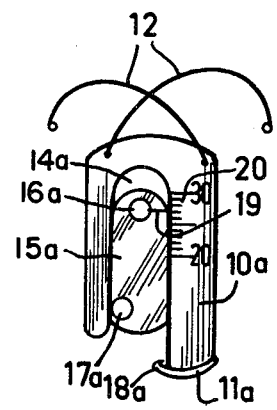
Figure 3:
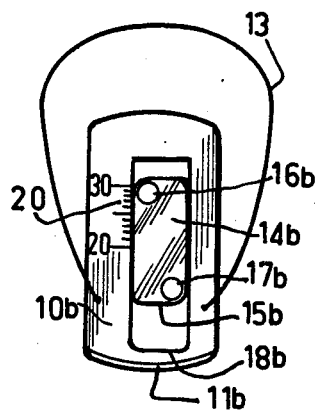

The devices shown in FIGS. 2 and 3 are generally similar to that of FIG. 1, generally corresponding elements being denoted by the same reference numerals accompanied by the designation "a" in FIG. 2 and "b" in FIG. 3.

As shown in FIGS. 1, 2 and 3, the device according to the invention comprises a support 10 made of opaque or coloured plastic material and having a comparatively small wall thickness which may be comprised between 2 and 4 mm.

Support 10 comprises, in a manner known per se, means adapted to allow said support to be placed into the groove of either of the rims of a spectacle frame. These means may comprise, on the one hand, a bevelled portion 11 provided at the lower part of support 10 and, on the other hand, two springs 12 of the "piano wire" type anchored in the upper part of support 10, or a single spring wire 13 such as shown in FIG. 3. Bevelled portion 11 and springs 12 or single spring 13 are adapted to be engaged into the groove of a corresponding rim of the spectacle frame and to maintain the device in a determined position with respect to said rim.

The surfaces of the bevelled portion 11 may be coated with a thin film of a material enhancing the adherence of the support 10 to the walls of the groove of the rim, such film being constituted, for example, by a layer of rubber or the like.

A recess 14 provided in support 10 is adapted to receive the reference element 15 which is mounted slidably within said recess. For this purpose, slide passageways are preferably provided in the side walls delimiting recess 14 laterally. These slide passageways may have a substantially V-shaped profile, and reference element 15 is adapted to engage said slide passageways.

It will be understood that these slide passageways furthermore contribute to reliably maintaining reference element 15 in recess 14.

Reference elements 15 and 15a may be constituted by a thin plate of opaque or coloured plastic material having a thickness of about 0.5 to 1 mm, as shown in FIGS. 1 and 2.

In the embodiment shown in FIG. 3, reference element 15 comprises a conveniently shaped wire.

In the embodiments of FIGS. 1 and 3, reference elements 15 and 15b are engaged under elastic deformation in the slide passageways provided in the slide walls of recesses 14 and 14b respectively. In the embodiment according to FIG. 2, said reference element is engaged through the open lower end of support 10a.

Reference element 15 comprises two reference circles 16 and 17 having a diameter of substantially 4 mm, which corresponds to the average diameter of the eyes' pupils under normal lighting conditions.

In the case of the reference element 15 constituted by a plate of plastic material, circles 16 and 17 may be formed by punching, piercing or the like, or by engraving one of the surfaces of the plate.

In the embodiment of FIG. 3, circles 16b and 17b are obtained by deformation of the wire constituting the reference element 15.

A stop 18 is provided at the lower portion or end of recess 14. In the embodiments shown in FIGS. 1 and 3, stops 18 and 18b are formed by the lower edge of recesses 14 and 14b which edges are substantially parallel to bevelled portions 11 and 11b.

In the embodiment of FIG. 2, stop 18a is formed by an extension of bevelled portion 11a protruding into recess 14a.

The distance between circles 16 and 17 is equal to the distance between the centres of remote vision and the centres of near vision of the corrective lenses having a progressively varying focal strength, i.e., about 15 mm.

The straight line connecting the centres of said circles forms an angle of about 10° with the vertical when the device is in its normal operating position.

A reference mark 19 is preferably engraved in front of circle 16 on plate 15 made of plastic material. This mark 19 is located on the horizontal straight line passing through the centre of circle 16.

A measuring scale 20 is provided on each front surface of support 10 in front of circle 16 and reference mark 19.

Figure 4:
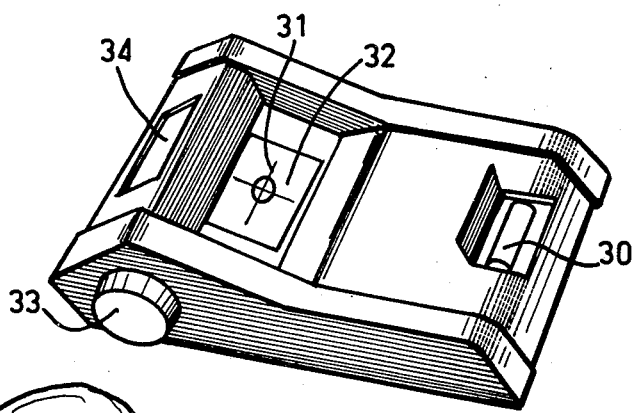
FIG. 4 shows a device known per se which can be used in combination with the device according to the present invention.
Figure 5:
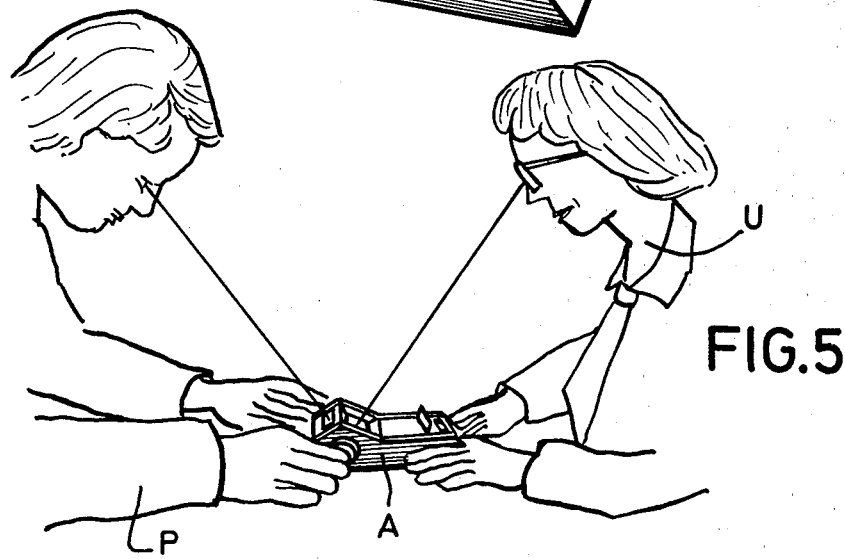
FIG. 5 illustrates by way of example one application of the device according to the invention in combination with the known device shown in FIG. 4.

The operation of the device will now be described especially with reference to FIGS. 4 and 5.

The optician, or similar specialist, places the device, according to the invention, into the groove of one of the rims of the spectacle frame choosen by the user. The optician asks the user to view a remote object and moves the reference element 15 so as to place circle 16 in front of the pupil of the related eye of the user.

The optician can then read, on measuring scale 20, the position of the pupil with respect to the internal lower edge of the rim of the spectacle frame.

If reference element 15 engages stop 18 while the pupil of the eye under examination is located below circle 16 the selected spectacle frame is not compatible with the prescribed glasses or lenses. Indeed, when the optician mounts the glasses, the centre of remote vision must be located in front of the pupil when remote objects are viewed, and thus the portion of the lens corresponding to near vision will be partially eliminated prior to mounting the lens. Consequently the user would, in this case, have at his disposal only an insufficient area of correction for viewing near or close objects, such an area being limited by the lower portion of the rim of the spectacle frame.

It will be well understood from the foregoing that the device according to the invention enables the compatibility of the spectacle frame with the prescribed corrective lenses and with the particular user to be checked without measuring.

The optician then places a second device, according to the invention, into the groove of the other rim of the spectacle frame, and checks and measures as described herein above. When this operation is terminated, he can check the coincidence of the direction of viewing of the user's eyes under the conditions of viewing an object located at a short distance (near vision), for example by means of a device such as the one illustrated in FIG. 4.

This device comprises a light source 30, cross-hairs 31 provided on a movable transparent blade 32 adapted to be appropriately oriented by means of an actuating button 33. A transparent window 34 allows the user to be observed.

The optician P (FIG. 5) places the device in front of the user U and causes him to view the cross-hairs 31 while appropriately adjusting the position, or orienting, blade 32. By observation through window 34 the optician can check the position of the pupils of the user's eyes; said pupils must be located in front of circles 17. If the optician detects a transverse offset of either of the pupils, or of both, with respect to circles 17 he can record the value of the off-centering of the lenses which must be taken into consideration when mounting said lenses, so as to ensure optimum vision for the user of the finished spectacles.

The invention is not limited to the embodiments described herein above and shown in the appended drawings. Numerous modifications and variants may be envisaged by those skilled in the art without departing from the spirit and scope of the invention as defined in the appended claims.

What is claimed is:

1. A measuring device, to be used when mounting corrective lenses having a progressively varying focal strength, on the grooved rims of a spectacle frame, for checking the compatibility of said lenses with said frame and with the user, and for monocularly measuring the vertical position of the pupils of a user's eyes with respect to the internal lower edge of said rims, said device comprising a nontransparent support having a recess therein, means for removably mounting and maintaining said support in the groove of one of said rims, a reference element vertically movable within said recess, said reference element comprising two circles, the straight line connecting the centers of said circles forming a comparatively small angle with the vertical when said measuring device is in the operating position thereof, said two circles having a diameter of substantially 4 mm, the straight line connecting the centers of the circles forming an angle of substantially 10° with the vertical when said measuring device is in said operating position, the distance between the centers of said circles being substantially equal to 15 mm, a stop provided at the lower portion of said recess, and at least one measuring scale provided on said support adjacent said reference element.

2. A measuring device, to be used when mounting corrective lenses having a progressively varying focal strength, on the grooved rims of a spectacle frame, for checking the compatibility of said lenses with said frame and with the user, and for monocularly measuring the vertical position of the pupils of the user's eyes with respect to the internal lower edge of said rims, said device comprising a nontransparent support having a recess therein, means for removably mounting and maintaining said support in the groove of one of said rims, a reference element vertically movable within said recess, said reference element comprising a flat plate having two spaced coplanar holes therein, the straight line connecting the centers of said holes forming a comparatively small angle with the vertical when said measuring device is in the operating position thereof.

* * * * *

UNITED STATES PATENT AND TRADEMARK OFFICE
CERTIFICATE OF CORRECTION

PATENT NO. : 4,167,067
DATED : September 11, 1979
INVENTOR(S) : Michel Guiset

It is certified that error appears in the above—identified patent and that said Letters Patent is hereby corrected as shown below:

Column 2, line 45: Change "15" to --15b--.

*Signed and Sealed this*

*Eighteenth* Day of *March 1980*

[SEAL]

Attest:

SIDNEY A. DIAMOND

*Attesting Officer*  *Commissioner of Patents and Trademarks*